(12) United States Patent
Patat et al.

(10) Patent No.: US 12,310,368 B2
(45) Date of Patent: May 27, 2025

(54) METHOD FOR THE PROPHYLACTIC TREATMENT OF A FOOD PRODUCT

(71) Applicant: Solvay SA, Brussels (BE)

(72) Inventors: Olivier Patat, Paris (FR); Jean-Philippe Pascal, Villers-les-Nancy (FR); Mathieu Belmond, Paris (FR)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 16/965,315

(22) PCT Filed: Feb. 4, 2019

(86) PCT No.: PCT/EP2019/052606
§ 371 (c)(1),
(2) Date: Jul. 28, 2020

(87) PCT Pub. No.: WO2019/149925
PCT Pub. Date: Aug. 8, 2019

(65) Prior Publication Data
US 2021/0360926 A1  Nov. 25, 2021

(30) Foreign Application Priority Data
Feb. 2, 2018 (EP) ................................. 18154984

(51) Int. Cl.
*A01N 59/00* (2006.01)
*A01N 25/12* (2006.01)
*A01P 7/04* (2006.01)
*A23B 7/157* (2006.01)
*A23B 9/30* (2006.01)

(52) U.S. Cl.
CPC ............. *A01N 59/00* (2013.01); *A01N 25/12* (2013.01); *A01P 7/04* (2021.08); *A23B 7/157* (2013.01); *A23B 9/30* (2013.01); *A23V 2002/00* (2013.01)

(58) Field of Classification Search
CPC ........... A01N 59/00; A01N 25/12; A01P 7/04; A23V 2002/00
See application file for complete search history.

(56) References Cited

U.S. PATENT DOCUMENTS

| 3,928,065 | A | * | 12/1975 | Savino | C11D 7/5013 |
| | | | | | 134/40 |
| 4,043,902 | A | | 8/1977 | Hartjens et al. | |
| 5,122,518 | A | | 6/1992 | Vrba | |
| 5,342,630 | A | | 8/1994 | Jones | |
| 5,439,690 | A | | 8/1995 | Knight | |
| 5,576,007 | A | | 11/1996 | Ikeda et al. | |
| 5,773,017 | A | | 6/1998 | Korunic et al. | |
| 5,830,512 | A | | 11/1998 | Vrba | |
| 6,342,535 | B1 | | 1/2002 | Bessette et al. | |
| 2002/0172713 | A1 | | 11/2002 | Einziger et al. | |
| 2003/0099680 | A1 | | 5/2003 | Guerassimoff | |
| 2006/0040031 | A1 | * | 2/2006 | Pascal | A01N 59/04 |
| | | | | | 426/532 |
| 2006/0159777 | A1 | | 7/2006 | Pascal et al. | |
| 2007/0037706 | A1 | | 2/2007 | Palangie et al. | |
| 2008/0171069 | A1 | | 7/2008 | Pascal et al. | |
| 2008/0213327 | A1 | | 9/2008 | Pascal et al. | |
| 2010/0172947 | A1 | | 7/2010 | Palangie et al. | |
| 2012/0003281 | A1 | | 1/2012 | Pascal et al. | |
| 2014/0348892 | A1 | * | 11/2014 | Pascal | A01N 25/04 |
| | | | | | 424/409 |

FOREIGN PATENT DOCUMENTS

| CN | 102815725 A | 12/2012 |
| EP | 0579951 A1 | 1/1994 |
| EP | 2679653 A1 | 1/2014 |
| FR | 2848780 A1 | 6/2004 |
| GB | 2309640 A | 8/1997 |
| JP | 57085990 A | 5/1982 |
| JP | S59142895 A | 8/1984 |
| JP | 05039206 A | 2/1993 |
| JP | 05201818 A | 8/1993 |
| JP | 0632706 A | 2/1994 |
| JP | 06040806 A | 2/1994 |
| WO | WO 98/38867 A1 | 9/1998 |
| WO | WO 01/035744 A1 | 5/2001 |
| WO | WO 02/102158 A1 | 12/2002 |
| WO | WO 2004/056183 A1 | 7/2004 |
| WO | WO 2004/056184 A1 | 7/2004 |
| WO | WO 2005/025317 A1 | 3/2005 |
| WO | WO 2006/097480 A1 | 9/2006 |
| WO | WO 2006/097504 A1 | 9/2006 |
| WO | WO 2007/045608 A1 | 4/2007 |
| WO | WO 2010/002980 A2 | 1/2010 |
| WO | WO 2012/085218 A1 | 6/2012 |
| WO | WO 2012/152952 A1 | 11/2012 |
| WO | WO 2013/092694 A1 | 6/2013 |
| WO | WO 2014/001417 A1 | 1/2014 |
| WO | WO 2016/034704 A1 | 3/2016 |

OTHER PUBLICATIONS

David A. Depasquale et al; (1990) Ammonium bicarbonate inhibition of mycotoxigenic fungi and spoilage yeasts; Journal of Food Protection, 53(4), 324-8.

Paul Fields; Diatoms Industrial Use: Diatomaceous earth as insecticide; Eureka: Diatoms-Nature's Germs; Aug. 2, 2002, pp. 1-6, XP002344782.

* cited by examiner

*Primary Examiner* — Andrew S Rosenthal

(74) *Attorney, Agent, or Firm* — Osha Bergman Watanabe & Burton LLP

(57) ABSTRACT

Method for the prophylactic treatment of the development of parasites in a food product with a powder comprising more than 40% by weight of an alkali metal bicarbonate, wherein the powder is in the form of particles having a medium particle size of at most 300 μm, and said treatment comprising mixing the powder with the food product, characterized in that at most 1000 ppm by weight of the powder is mixed with the food product.

20 Claims, No Drawings

METHOD FOR THE PROPHYLACTIC TREATMENT OF A FOOD PRODUCT

CROSS-REFERENCE TO RELATED APPLICATIONS

The present application is a U.S. national stage entry under 35 U.S.C. § 371 of International Application No. PCT/EP2019/052606 filed Feb. 4, 2019, which claims priority to European Patent Application No. 18154984.1 filed Feb. 2, 2018, the whole content of this application being incorporated herein by reference for all purposes.

TECHNICAL FIELD

The invention relates to an improved method for the prophylactic treatment of the development and/or survival of parasites in a food product, and in particular in oil plants, seeds, grains or cereals. The invention relates also to a food product obtainable with such method.

The present invention also relates to the use of a powder comprising more than 40% by weight of an alkali metal bicarbonate, wherein the powder is in the form of particles having a medium particle size of at most 300 μm, using such method, for its prophylactic effect against the development in the food product of parasites, by using a dosage of the powder in the food product so that the mortality of the parasite is at most the mortality of the parasite without food.

TECHNICAL BACKGROUND

The preservation and storage, in particular after harvesting, of food products is an age old problem that has arisen since the dawn of time and the emergence of agriculture.

For example, today, the worldwide production of cereals is about 2.6 billion metric tons and requirements are increasing by about 2% to 3% per year (source: FAO, 2018). Climatic conditions can cause regional variations in production from one year to another of about 30%. It is therefore essential to be able not only to store food products and cereals between two successive harvests, but also to store them and to preserve them over longer periods in order to constitute safety stocks and to regionally avoid famines. The amount of worldwide cereal reserve stocks is currently estimated (December 2018) at 760 million metric tons.

Modern practices of food product storage in silos generally comprise: meticulous cleaning of the silos and of the handling circuits before filling; optionally followed by treatment of the silos by spraying or thermonebulization of an approved liquid or gaseous parasiticide; then filling of the silos with food products or cereals at a controlled degree of humidity; then control and regulation of the humidity and of the temperature of the products during storage.

It is known practice to combat parasites by means of neurotoxic and growth-inhibiting substances such as pyrethroids, organohalogenated compounds (such as organofluorinated, organochlorinated or organobrominated compounds), organophosphorus compounds, and carbamates, or by means of cytotoxic substances such as aluminium phosphides or zinc phosphides. Currently, in many countries, only a small number of active substances are authorized against stored-product insects. These products are applied either by spraying or by thermonebulization. These substances have the risk of also being toxic to humans or animals when the food products are treated with such substances.

It is also known that parasiticidal compositions such as those based on natural or synthetic pyrethroids, or on organophosphorus compounds used as alternatives to organohalogenated compounds, have an effectiveness that decreases over time. These parasiticidal compositions have an action that can be described as "shock action". They are generally effective for about a few months. This is due to non-zero vapour pressures of the components that give rise to their volatilization over time and moreover to their degradation by oxidation.

The food products are generally treated with a parasiticidal substance before their storage in silos. The products are then controlled in order to guarantee a residual parasiticide threshold below the Maximum Residue Limits (MRLs) and the contractual limits. These MRLs are regulated values. The MRLs are regularly lowered in order to reduce the risks in consuming food products associated with such parasiticides. Reducing MRLs generally poses problems for long-term storage, in particular storage for more than one month, or for more than 3 months. For oilseeds (rapeseed, sunflower, peanut, etc), only treatments by fumigation (for example with aluminium phosphide) are authorized, and the MRLs are up to 100 times lower than on cereals; the MRLs are then generally at the level of the limit of detection.

The amount of residual pesticides in cereals or food products such as oleaginous seeds or legume seeds, in the food-chain for humans or animals, comes most frequently from the pesticides (such as pyrimiphos, deltamethrin, cypermethrin, or chlorpyriphos-M) added after harvest for storage purpose.

Therefore there is a need to find a solution for the storage of food products while avoiding or minimizing use of neurotoxic or growth-inhibitor chemicals cited above for food products suchs as:
- cereals (wheat, rice, maize, sorghum),
- "pseudocereals" (grains of the family Polygonaceae such as buckwheat; or grains of the family Chenopodiaceae such as quinoa, amaranth; or grains of Pedaliaceae such as sesame);
- oil plants (such as rapeseed, sunflower, peanut, linum);
- legume seeds or bean seeds (such as horse beans also known as fava beans, French beans, lentils and peas, or beans of the family Fabaceae).

US 2006/0040031 discloses acaricidal and insecticidal effects of a powder comprising sodium bicarbonate in the storage of cereals.

WO 2013/092694 discloses a method for manufacturing a parasiticidal composition comprising alkali metal bicarbonate and silica.

JP 19930102849 describes insecticidal particles having a size smaller than the hair distance of insect pests.

WO2016/034704 discloses the use of minerals powders such as alkali bicarbonates on the surface of empty cereals silos walls and surfaces (before grain storage season) as prophylactic treatment against parasites, using at least 10 g of the minerals per $m^2$ of silos walls and surfaces. Such a layer of minerals enables to form a protective layer avoiding insects and other arthropods to access to food (such as cereals dusts) on emptied silos, before next crop be stored in it.

SUMMARY OF THE INVENTION

It has been surprisingly found by the present inventors that a reduced dose of an alkali metal bicarbonate powder mixed directly with the food product such as cereals, oleagineous seeds, or legume seeds and beans, forming a thin powder layer on the food product surface such as the cereals or seeds surface, albeit not necessarily continuous on the food product surface, enables to reduce by a factor of 100 to 1000 the quantity of such minerals needed, reported per unit surface of the food product surface (e.g., cereals or seeds surface) compared to the quantity of minerals needed on silos surfaces described by the prior disclosure (such as WO2016/034704) from the same inventors, to avoid that parasites access to the food product (such as cereal dust or grains) as food.

Such a prophylactic treatment provides an improved method for treatment against the development of parasites in the storage of food products which make it possible to reduce the amounts of minerals used and/or reduce the residual content of pesticides listed above, or even to completely eliminate the treatment of food products with such pesticide substances. This is an important improvement. This prophylactic treatment allows preserving, for a longer period of time, food products of "organic" quality from parasites, or food products with reduced pesticides, in particular neurotoxic or growth inhibitor pesticides. Unlike other parasitical treatment using compounds which are volatile and get into the atmosphere after being applied into the food product, thereby potentially losing effectiveness over time, the present prophylactic treatment using the minerals as explained herein provides long lasting protection against the parasites in such food products over time, because the alkaline metal bicarbonate is not volatile and remain in the food product (such as grains or seeds) over time under storage conditions, thereby assuring protection of the food product without decreasing the efficacy of the minerals on the food product against parasites over time.

Indeed alkali metal bicarbonates, such as sodium bicarbonate, potassium bicarbonate are common-used food and feed additives (for instance in European Union Regulation EU-68/2013 establishing the catalog of feed addtives), and are available on food grade. They provide useful source of alkali metal such as sodium, and potassium that are necessary to human beings and animals.

They are also already used in the food-chain as leavening agent in flour preparations or as pH buffer for human or animal feed. Moreover alkali metal bicarbonates are compounds already naturally present in plants and rivers or the sea, and already present in human and animal blood playing an important role as pH buffer.

The inventors of the present invention have noted that alkali metal bicarbonate powder in the form of fine particles mixed with food product such as grains or seeds, even as very thin and non-evenly continuous layer to cover the food product surface make it possible to produce a barrier screen between parasite pests of food products and their food, in a quantity far less than the one previously disclosed. Although this enables a prophylactic treatment of food products without parasiticidal effect on parasites such as insects and arthropods, just avoiding that corresponding parasites access to the food and avoiding their development in stored food product.

The inventors of the present invention have also noted that alkali metal bicarbonate powder in the form of fine particles mixed with food product such as grains, seeds or nuts, produces a mechanical protection of said food product, limiting breakage and dust formation during handling and storage.

Moreover the inventors have observed that alkali bicarbonate powder prevents agglomeration of impurities in stored food product and eases their removal with air or gas separators and/or sieving. It is supposed by the inventors that such alkali bicarbonate powder acts as desiccant and/or anti-electrostatic agent on impurities or on food product dust that eases their separation.

The inventors have also noted that alkali metal bicarbonate powder increases the recovery of impurities, of dust and of broken grains when a treated food product with such powder, is then treated in a device for dedusting said food product, such as grains, seeds or nuts. It is supposed that such alkali bicarbonate fine powders may then also act as a mechanical agent that eases separation of the corresponding dust or broken grains, broken seeds or broken nuts from coarser grains, seeds and nuts; or acts as a conductive salt that reduces electrostatic electricity between dust and food product, improving separation of fine impurities from more valuable food product of coarser grain size product or undamaged grains, seeds or nuts.

In addition to the physical barrier screen that they form between parasite and food, an additional effect can in particular come to be added by raising the content of salts partially soluble in the food, such as salts comprising alkali metals (such as sodium or potassium), or bicarbonates which make the food unsuitable for consumption by the parasite. For example, the presence of alkali metals in the food of the parasite increases the osmotic pressure in the internal fluids of the parasite, and such parasite self-limits the consumption of food which is too salty for itself. It has been observed that the parasite self-limits the consumption of such a food.

Thus, the alkaline metal bicarbonate used in the present invention makes the food of the parasite inaccessible and/or unattractive, without being parasite-repellent, thereby providing the prophylactic effect for the purposes of the present invention.

The mineral (e.g., alkaline metal bicarbonate) in the form of particles thus make it possible to prevent these parasites from colonizing the storage sites of food products during storage.

The mineral (e.g., alkaline metal bicarbonate) in the form of particles thus make it possible to reduce the development of secondary insect pests during the food product storage after treatment with said mineral and dedusting, compared to dedusted food product but untreated with said mineral.

In some embodiments, the mineral in the form of particles can be applied directly to the food product as a preventive technique, for example by mixing with the food product just after harvest either before, during or after its loading into a storage unit, to prevent growth of the parasites or even to prevent the survival of a parasite which may enter the food product storage unit.

In some additional or alternate embodiments, the mineral (e.g., alkaline metal bicarbonate) in the form of particles can be applied to an already-infested untreated food product as a curative technique, for example to prevent growth of the parasites, to prevent further proliferation of the parasites, and/or even to eradicate the parasites which are infesting the food product.

In some other embodiments, the mineral (e.g., alkaline metal bicarbonate) in the form of particles may be applied to a previously-treated food product as a curative and/or preventive technique, where the previously-treated food product was first treated with a pesticide as described above but which has lost its initial effectiveness due to some loss to the atmosphere in the storage unit where the previously-treated food product has been stored. This method would then be effective in preventing the development and/or survival of parasites if the previously-treated food product now presents some sign of parasites infestation inside the storage unit, or even before parasites infestation appears during a long-term storage scenario.

Additionally, it has been found that the method for prophylactic treatment, as applied to grains/seeds for example, does not impact the quality of the treated grains/seeds.

Consequently, the present invention relates to a method for the prophylactic treatment of the development and/or survival of parasites in a food product with a powder comprising more than 40% by weight of an alkali metal bicarbonate, wherein the powder is in the form of particles having a medium particle size of at most 300 μm, and said treatment comprising mixing the powder with the food product, characterized in that at most 1000 ppm by weight of the powder is mixed with the food product (wherein 'at most 1000 ppm' means 'at most 1000 mg of the powder reported to one kg of food product).

A first advantage of the present invention lies in the very small amount of alkali bicarbonate to be used relative to the weight of stored food products.

A second advantage of the invention is that alkali bicarbonates chosen in the present invention can be selected from the food-quality additives for humans or animals according to the FAO.

A third advantage of the invention is that of being able to reduce the amount of pesticide of pyrethroid, organohalogenated, organophosphorus or carbamate type during food product storage, and even making it possible to avoid the use of such pesticides during storage.

A fourth advantage of the invention lies in the possibility of combining such a method with the techniques of treatment by gradual cooling of the food products stored in silos to a temperature below 10° C., in order to preserve the food products, for example of "organic" quality, or the oil plants, or nuts.

A fifth advantage of the invention is the compatibility of alkali bicarbonates with food-products acting as pH buffer and improving digestion for human food or animal feed.

A sixth advantage of the invention is the possibility to use the prophylactic treatment against the development in the food product of insects, acarids, fungi, and mycotoxins generated by fungi.

A seventh advantage of the invention is the possibility to disperse the alkali bicarbonates in food products either by dry blending, dry spraying, or by spraying an aqueous solution or an aqueous suspension of the alkali metal bicarbonate powder with limited quantity of water reported to the food product, due to the very low quantities of alkali bicarbonates (few tens or hundreds of ppm) needed reported to food product for the prophylactic treatment. Such low quantity of water can be easily dried by natural contact with air or by ambient air blowing.

An eighth advantage of the invention is the improved separation of impurities (such as land dust, dirt dust, clays from fields, food-product dust) from coarser grains, seeds or nuts, in air separators and/or in mechanical separators on sieves.

A ninth advantage of the invention is the reduced explosivity and/or flame hazards of food product dust on filters or stored in silos, as alkali bicarbonate is an effective flame retardant.

A tenth advantage of the invention, along with the improved impurities and/or food-product dust separation, is the improved working conditions for workers that have to act in food-product silos or tanks, as the level of dust in ambient air and on walls is sensitely reduced.

Definitions

In the present invention, in the present descriptive specification, some terms are intended to have the following meanings.

The term "parasites" is intended to mean arthropods such as insects or acarids which develop in food products, and in particular those which develop in cereals, oleaginous seeds, legumes seeds or beans. Insects have 6 legs, a body in three parts: head, thorax, and abdomen, 2 antennas, and often also have wings. Acarids have 8 legs.

The term "primary insects pest" is intended to mean insects which develop in food products such as cereals, seeds or nuts, that pierce the grains and lay eggs inside the grains (or inside seeds or nuts).

The term "secondary insects pest" is intended to mean insects which develop in food products such as cereals, seeds or nuts, but that are unable to pierce the grains and enable to lay eggs inside the grains. They feed on broken grains or on grain dust (or seeds or nuts).

The term "prophylactic treatment method" is intended to mean a method which makes it possible to limit, preferably prevent the development of parasite in food product.

In a preferred embodiment, the prophylactic treatment of the food product is intended to mean that it limits the development of parasite in food product and that the mortality rate of parasite in contact with food product at a temperature of at 23.5° C.+/−1.5° C., and at 61.5%+/−1.5% relative humidity, is at most 15+/−4% after 7 days.

In a more preferred embodiment, the prophylactic treatment of the food product is intended to mean that it limits the development of parasite in food product and that the mortality rate of parasites in contact with food product at a temperature of at 23.5° C.+/−1.5° C. and at 61.5%+/−1.5% relative humidity, is at most the mortality rate of the parasite without food.

The term "food products" is intended to mean grains or beans of plants used mainly in feeding humans and animals, in the form of whole grains or milled grains (flours), such as the grains or beans of:
  Cereals: of the family Poaceae (wheat, rice, maize, sorghum, etc.), namely cereals in the strict sense;
  "Pseudocereals": namely grains of the family Polygonaceae (buckwheat, etc.), Chenopodiaceae (quinoa, amaranth, etc.), Pedaliaceae (sesame, etc.);
  Oil plants (rapeseed, sunflower, soybeans, peanut, etc.);
  Horse beans (also known as fava beans), French beans, Lentils and Peas, in particular of the family Fabaceae;
  Nuts from wallnuts fruits (nuts, hazelnuts, almonds, pinenuts, pecans, macadamia, Brazilnuts,) selected from botanical nuts, dupe seeds, nuts from gymnosperm seeds, nuts from angiosperm seeds (exemple: macadamia, peanuts, Brazil nuts,).

The term "food product storage silo" or "food product storage unit" is intended to mean a reservoir intended for storing the food product.

The term "food product storage" is intended to mean the act of forming a store of food products, comprising all or some of the following operations: filling, preserving, and emptying of the food product store.

The term "mineral" is intended to mean an essentially inorganic compound, generally containing less than 20%, preferably less than 5%, or more preferably less than 1% by weight of organic matter.

The term "alkali metal bicarbonate" is intended to mean a mineral selected among the group of: lithium bicarbonate, sodium bicarbonate, potassium bicarbonate, trona, or mixtures thereof.

The term "trona" is intended to mean a mineral containing at least 60%, preferably at least 80%, more preferably at least 90%, even more preferably at least 95% by weight of sodium sesquicarbonate ($NaHCO_3.N2CO_3.2H_2O$). The remainder of the mineral generally consists of clays, or carbonate of calcium or magnesium.

The term "medium particle size" is intended to mean the weight-average diameter of particles measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and an MS 17 liquid preparation unit, using ethanol saturated with bicarbonate at ambient temperature (22° C.).

The term "co-formulant" is intended to mean a compound of the type co-formulant or of the type gelling agent. The term "co-formulant" is also intended to mean a compound which is a desiccant, and/or facilitates the flow of the alkali bicarbonate in particle form, in particular the compounds which, mixed with the alkali bicarbonate, reduce its angle of repose as measured by ISO standard 3435-1977, and that preferably is an anti-caking agent of alkali bicarbonate.

The term "gelling agent" is intended to mean a compound that allows to increase the viscosity of an aqueous suspension of 35% by weight of a powder based on the suspension, measured on a Brookfield viscometer equipped with a mobile S63 rotating at 60 revolutions per minute.

The term "neurotoxic" is an adjective intended to describe a substance or compound which negavitively impacts a nervous system. Neurotoxicity in the nervous system occurs when exposure to a neurotoxic substance or compound, also called a neurotoxin, alters the normal activity of the nervous system in such a way as to cause damage to nervous tissue.

The term "growth inhibitor" or "growth inhibiting" is an adjective intended to describe a substance or compound which specifically reduces the growth of a cell or organism after being exposed to such substance or compound.

The term "cytotoxic" is an adjective intended to describe a substance or compound which has the ability to destroy a living cell. A cytotoxic compound can induce a healthy living cell to undergo necrosis (accidental cell death) or apoptosis (programmed cell death).

As used herein, the terms "% by weight", "wt %", "wt. %", "weight percentage", or "percentage by weight" can be used interchangeably.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

The phrase 'A and/or B' refers to the following choices: element A; or element B; or combination of A and B (A+B).

The phrase 'A1, A2, and/or An' with n>3 refers to the following choices: any single element Ai (i=1, 2, n); or any sub-combinations of less than n elements Ai; or combination of all elements Ai.

The use of the singular herein includes the plural (and vice versa) unless specifically stated otherwise.

In the present specification, the choice of an element from a group of elements also explicitly describes:
  the choice of two elements or the choice of several elements from the group,
  the choice of an element from a subgroup of elements consisting of the group of elements from which one or more elements have been removed.

In addition, it should be understood that the elements and/or the characteristics of a method or a use, described in the present specification, can be combined in all ways possible with the other elements and/or characteristics of the method, or of use, explicitly or implicitly, this being without departing from the context of the present specification.

In the passages of the present specification that will follow, various embodiments or items of implementation are defined in greater detail. Each embodiment or item of implementation thus defined can be combined with another embodiment or with another item of implementation, this being for each mode or item unless otherwise indicated or clearly incompatible when the range of the same parameter of value is not connected. In particular, any variant indicated as being preferred or advantageous can be combined with another variant or with the other variants indicated as being preferred or advantageous.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

The term "comprising" includes "consisting essentially of" and also "consisting of".

In the present specification, the use of "a" in the singular also comprises the plural ("some"), and vice versa, unless the context clearly indicates the contrary. By way of example, "an alkali bicarbonate" denotes one alkali bicarbonate or more than one alkali bicarbonate.

If the term "approximately" is used before a quantitative value, this corresponds to a variation of ±10% of the nominal quantitative value, unless otherwise indicated.

DETAILED DESCRIPTION OF THE INVENTION

The present invention thus relates to:
  a method for the prophylactic treatment of the development of parasites in a food, and
  a use of a powder comprising more than 40% by weight of an alkali metal bicarbonate for its prophylactic effect against the development in the food product of parasites, by using a dosage of the powder in the food product so that the mortality of the parasite is close or at most the mortality of the parasite without food, as described with more particular embodiments hereinafter.

Item 1. Method for the prophylactic treatment of the development of parasites in a food product with a powder comprising more than 40% by weight of an alkali metal bicarbonate, wherein the powder is in the form of particles having a medium particle size of at most 300 μm, preferably at most 200 μm, and said treatment comprising mixing the powder with the food product, characterized in that at most 1000 ppm by weight of the powder is mixed with the food product, wherein 'at most 1000 ppm' means 'at most 1000 mg of the powder reported to one kg of food product.

Item 2. The method according to item 1 wherein at most 900 ppm, or at most 800 ppm, or at most 700 ppm, or at most 600 ppm, or at most 500 ppm, or preferably at most 300 ppm, more preferably at most 200 ppm, even more preferably at most 100 ppm by weight of the powder is mixed with the food product.

Item 2a. The method according to item 1 wherein at most 900 ppm, or at most 800 ppm by weight of the powder is mixed with the food product.

Item 2b. The method according to item 1 wherein at most 700 ppm, or at most 600 ppm by weight of the powder is mixed with the food product.

Item 2c. The method according to item 1 wherein at most 500 ppm, or preferably at most 300 ppm by weight of the powder is mixed with the food product.

Item 2d. The method according to item 1 wherein at most 250 ppm, or at most 200 ppm by weight of the powder is mixed with the food product.

Item 2e. The method according to item 1 wherein at most 190 ppm, or at most 150 ppm by weight of the powder is mixed with the food product.

Item 3. The method according to anyone of items 1 to 2e, wherein at least 10 ppm, preferably at least 20 ppm, more preferably at least 30 ppm, even more preferably at least 50 ppm by weight of the powder is mixed with the food product.

Item 3a. The method according to anyone of the preceding items, wherein at least 10 ppm, or at least 20 ppm by weight of the powder is mixed with the food product.

Item 3b. The method according to anyone of the preceding items, wherein at least 30 ppm, even more preferably at least 50 ppm by weight of the powder is mixed with the food product.

Item 4. The method according to anyone of the preceding items, wherein the powder comprises at least 50% by weight, preferably at least 60% by weight of the alkali metal bicarbonate.

Item 4a. The method according to anyone of the preceding items, wherein the powder comprises at least 70% by weight, more preferably at least 75% by weight of the alkali metal bicarbonate.

Item 4b. The method according to anyone of the preceding items, wherein the powder comprises at least 80% by weight, most preferably at least 85% by weight of the alkali metal bicarbonate.

Item 5. The method according to anyone of the preceding items, wherein the powder comprises at most 100% by weight or comprises 100% by weight of the alkali metal bicarbonate.

Item 5a. The method according to anyone of the preceding items, wherein the powder comprises at most 99% by weight, or at most 98% by weight of the alkali metal bicarbonate.

Item 5b. The method according to anyone of the preceding items, wherein the powder comprises at most 95% by weight, or at most 90% by weight of the alkali metal bicarbonate.

Item 5c. The method according to anyone of the preceding items, wherein the powder comprises at most 85% by weight, or at most 80% by weight of the alkali metal bicarbonate.

Item 6. The method according to anyone of the preceding items, wherein the alkali metal bicarbonate is chosen from: sodium bicarbonate, potassium bicarbonate, sodium sesquicarbonate, trona, and mixtures thereof.

Item 6a. The method according to anyone of the preceding items, wherein the alkali metal bicarbonate is sodium bicarbonate.

Item 6b. The method according to anyone of the preceding items, wherein the alkali metal bicarbonate is potassium bicarbonate.

Item 6c. The method according to anyone of the preceding items, wherein the alkali metal bicarbonate is sodium sesquicarbonate or trona.

Item 7. The method according to anyone of the preceding items, wherein the powder comprises at least 1% by weight (wt. %) of a co-formulant chosen from: a silica, a diatomaceous earth, an alkaline-earth metal silicate, a clay, a montmorillonite, a zeolite, or mixtures of two or more thereof.

Item 7a. The method according to the preceding item, wherein the co-formulant is a silica or a diatomaceous earth.

Item 7b. The method according to anyone of the items 1 to 7, wherein the co-formulant is an alkaline-earth metal silicate or a clay.

Item 7c. The method according to anyone of the items 1 to 7, wherein the co-formulant is a montmorillonite or a zeolite.

Item 8. The method according to any items 7 to 7c wherein the powder comprises at least 2% by weight, or at least 3% by weight of the co-formulant.

Item 8a. The method according to any items 7 to 8 wherein the powder comprises at least 5% by weight, or at least 7% by weight of the co-formulant.

Item 8b. The method according to any items 7 to 8a wherein the powder comprises at least 10% by weight, or at least 15% by weight of the co-formulant.

Item 9. The method according to item 7 or 8, wherein the powder comprises at most 50% by weight, or at most 40% by weight of the co-formulant.

Item 9a. The method according to any items 7 to 9, wherein the powder comprises at most 30% by weight, or at most 25% by weight of the co-formulant.

Item 9b. The method according to any items 7 to 9a, wherein the powder comprises at most 20% by weight or at most 15% by weight of the co-formulant.

Item 9c. The method according to any items 7 to 9b, wherein the powder comprises at most 10% by weight or at most 6% by weight of the co-formulant.

Item 10. The method according to anyone of the preceding items, wherein the medium particle size of the powder is at most 100 μm, or at most 70 μm.

Item 10a. The method according to anyone of the preceding items, wherein the medium particle size of the powder is at most 60 μm, or at most 50 μm.

Item 10b. The method according to anyone of the preceding items, wherein the medium particle size of the powder is at most 40 μm, or at most 30 μm.

Item 10c. The method according to anyone of the preceding items, wherein the medium particle size of the powder is at most 20 μm, or at most 10 μm.

Item 11. Method according to anyone of the preceding items, according to which the alkali metal bicarbonate comprises sodium bicarbonate and the co-formulant of the mineral comprises silica.

Item 12. Method according to the preceding item, according to which the alkali metal bicarbonate is sodium bicarbonate and the co-formulant of the mineral is silica.

Item 13. Method according to anyone of the items 7 to 12, according to which at most 600 ppm, preferably at most 300 ppm, more preferably at most 50 ppm, or at most 45 ppm, or at most 30 ppm, or at most 15 ppm, or at most 10 ppm, or at most 5 ppm by weight of the co-formulant reported to the food-product is mixed with the food-product.

Item 13a. Method according to anyone of the preceding items, according to which at most 150 ppm, more preferably at most 50 ppm of the co-formulant reported to the food-product is mixed with the food-product.

Item 13b. Method according to anyone of the preceding items, according to which at most 30 ppm, or at most 15 ppm by weight of the co-formulant reported to the food-product is mixed with the food-product.

Item 13c. Method according to anyone of the preceding items, according to which at most 10 ppm, or at most 5 ppm by weight of the co-formulant reported to the food-product is mixed with the food-product.

Item 14. Method according to anyone of the items 7 to 13c, according to which at least 0.5 ppm, preferably at least 1 ppm, more preferably at least 2 ppm, even more preferably at least 3 ppm, or at least 5 ppm of the co-formulant is mixed with the food product.

Item 14a. Method according to the preceding item, according to which at least 0.5 ppm, or at least 1 ppm by weight of the co-formulant reported to the food-product is mixed with the food product.

Item 14b. Method according to item 14a, according to which at least 2 ppm, or at least 3 ppm of the co-formulant reported to the food-product, is mixed with the food product.

Item 14c. Method according to item 14b according to which at least 5 ppm of the co-formulant is mixed with the food product.

Item 15. Method according to anyone of the preceding items, according to which the powder is free of neurotoxic pesticide.

Item 16. Method according to anyone of the preceding items, according to which the powder is free of (added) pyrethrum or of (added) synthetic pyrethroids, such as permethrin.

Item 17. Method according to anyone of the preceding items, according to which the powder is free of (added) organohalogenated pesticides (such as organofluorinated, organochlorinated or organobrominated pesticides), organophosphorus pesticides, and carbamates, or by means of cytotoxic pesticides such as aluminium phosphides or zinc phosphides.

Item 18. Method according to anyone of the preceding items, according to which the powder is inorganic.

Item 19. Method according to any of the preceding items which is non-parasiticidal.

Item 20. Method according to any of the preceding items which is without being parasite-repellent, in particular insect or acarid repellent.

Item 21. Method according to any one of preceding items, according to which the co-formulant if present, is in the form of particles, such that at least 50% by weight of the particles have a particle size of less than 100 μm, preferably less than 70 μm.

Item 21a. Method according to any one of preceding items, according to which the co-formulant if present, is in the form of particles, such that at least 50% by weight of the particles have a particle size of less than 40 μm, even more preferably less than 30 μm.

Item 22. Method according to any one of preceding items, according to which the alkali metal bicarbonate, and the co-formulant if present, is (are) in the form of particles, such that at least 90% by weight of the particles have a particle size of less than 100 μm.

Item 22a. Method according to any one of preceding items, according to which the alkali metal bicarbonate, and the co-formulant if present, is (are) in the form of particles, such that at least 90% by weight of the particles have a particle size of less than 70 μm.

Item 22b. Method according to any one of preceding items, according to which the alkali metal bicarbonate, and the co-formulant if present, is (are) in the form of particles, such that at least 90% by weight of the particles have a particle size of less than 40 μm.

Item 22c. Method according to any one of preceding items, according to which the alkali metal bicarbonate, and the co-formulant if present, is (are) in the form of particles, such that at least 90% by weight of the particles have a particle size of less than 30 μm.

Item 23. Method according to anyone of the preceding items, according to which the mixing of the powder to the food product is carried out by dry spraying such as on a conveyor belt or on the top of a silo when filling said silo with the food product.

Item 23a. Method according to anyone of the preceding items, according to which the mixing of the powder to the food product is carried out by a mechanical mean for mixing said food-product and the powder.

Item 23b. Method according to anyone of the preceding items, according to which the mixing of the powder to food product is carried out by sprinkling or spraying the powder in the form of an aqueous suspension of the powder, and then drying.

Item 24. Method for storing food product in a silo or in a receptacle, using the method according to any one of the preceding items, according to which the mixing of the powder to the food product enables to obtain a treated food product, the silo or the receptacle is filled with the treated food product, and the treated food product is subject to one or more cooling steps to lower its temperature to at most 10° C.

Item 25. Method for storing food product according to the preceding item, according to which the cooling of the food product to at most 10° C. is carried out by ventilation with cool air, in particular with cool air having a temperature at most 8 to 10° C. lower than the temperature of the food products.

Item 26. Use of a powder comprising more than 40% by weight of an alkali metal bicarbonate, wherein the powder is in the form of particles having a medium particle size of at most 300 μm, preferably at most 200 μm, according to the method of anyone of the preceding items, for its prophylactic effect against the development in the food product of parasite, by using a dosage of the powder in the food product so that the development of parasite in food product is limited, and that the mortality rate of parasite in contact with food product at a temperature of at 23.5° C.+/−1.5° C. and at 61.5%+/−1.5% relative humidity, is at most 15+/−4% after 7 days.

Item 26a. Use according the preceding item, wherein the dosage of the powder used in the food product is such that it limits the development of parasite and that the mortality of the parasite is at most the mortality of the parasite without food.

Item 26b. Use according to items 26 or 26a, wherein the parasite is a primary insect pest such as: *Sitophilus granarius, Sitophylus oryzae, Rhyzopertha dominica, Sitotroga cereallela, Acanthoscelides obtectu, Bruchus pisorum, Cryptolestes turcicus, Trogoderma granarium*.

Item 26c. Use according to items 26 or 26a, wherein the parasite is a secondary insect pest such as: *Tribollium confusum, Tribollium castaneoum, Cryptolestes ferrugineus, Cryptophagus* spp, *Endrosis sarcitrella, Oryzaephilus surinamensis, Lasioderma serricorne, Tenebroides mauritanicus, Typhaea stercorea, Stegobium paniceum, Plodia interpunctelle, Ephestia kuehniella, Trogoderma variabile*.

Item 26d. Use according to items 26 or 26a, wherein the parasite is a mycophagus insect pest such as: *Ptinus tectus, Ahasverus advena, Xylocoris flavipes, Typhea stercorea, Tenebroides mauritanicus, Niptus hololeucus, Lariophagus distinguendus*.

Item 27. The use according to items 26 to 26d, in the method according to any one of items 1 to 25.

Item 28. The use according to items 26 or 27, for its combined prophylactic effect against the development in the food product of insects, acarids, fungi, and mycotoxins.

Item 29. Food product, having a shape of a grain or of a bean, wherein said shape defining a surface, and having on said surface at least 10 ppm and at most 1000 ppm of a powder comprising more than 40% by weight of an alkali metal bicarbonate, and wherein the powder is in the form of particles having a medium particle size of at most 300 μm.

Item 29a. Food product, according to the preceding claim wherein mortality rate of *Sitophilus Oryza* (or anyone of the parasites cited in items 26b to 26d), in contact with said food product, and measured at a temperature of 23.5° C.+/−1.5° C. and at 61.5%+/−1.5% relative humidity, measured with 50 individuals in contact with a batch of 2 kg of the food product, is at least 34% of individuals after 7 days, and at most the mortality after 15 days of said parasite in same conditions but deprived of food.

Item 30. Food product according to Item 29 or 29a, obtainable by the method of Items 1 to 25, or the use of items 26 to 28.

Item 31. Use of a powder on a food product selected from grains, seeds, beans or nuts to improve dedusting of the food product during mechanical or gas-flow separation wherein the food product is first mixed with a powder comprising more than 40% by weight of an alkali metal bicarbonate, and wherein the powder is in the form of particles having a medium particle size of at most 300 μm, characterized in that at least 10 ppm and at most 2000 ppm by weight of the powder is mixed with the food product before the mechanical or gas-flow separation.

Item 31a. Use according to item 31, wherein at least 50 ppm or at least 100 ppm of the powder reported to the food product is mixed with the food product.

Item 31b. Use according to item 31 or 31 a, wherein at most 1000 ppm or at most 300 ppm of the powder reported to the food product is mixed with the food product.

Item 31c. Use according to item 31, wherein at least 50 ppm and at most 300 ppm of the powder reported to the food product is mixed with the food product.

Item 32. Use of a powder on a food product selected from grains, seeds, beans or nuts to reduce explosion hazards in storage silo and in dedusting lines, wherein the food product is first mixed with a powder comprising more than 40% by weight of an alkali metal bicarbonate, and wherein the powder is in the form of particles having a medium particle size of at most 300 μm, preferably at most 70 μm, characterized in that at least 10 ppm and at most 2000 ppm by weight of the powder is mixed with the food product before or when storing the food product in the storage silo, or before the mechanical or gas-flow separation.

Item 32a. Use according to item 32, wherein at least 50 ppm or at least 100 ppm of the powder reported to the food product is mixed with the food product.

Item 32b. Use according to item 32 or 31 a, wherein at most 1000 ppm or at most 300 ppm of the powder reported to the food product is mixed with the food product.

Item 32c. Use according to item 32, wherein at least 50 ppm and at most 300 ppm of the powder reported to the food product is mixed with the food product.

Item 33. Method according to anyone of items 1 to 25 wherein the powder comprising more than 40% by weight of an alkali metal bicarbonate is used for a combined prophylactic effect and a dedusting improvement effect.

Item 34. Method according to anyone of items 1 to 25 wherein the powder comprising more than 40% by weight of an alkali metal bicarbonate is used for a combined prophylactic effect and a reduced explosion hazards during silo storage and/or food product dedusting.

In any of the embodiments of the present invention, the minerals, in particular the alkaline metal bicarbonate, are either natural, or produced synthetically.

In one preferred mode of the present invention, the alkaline metal bicarbonate and/or the co-formulant are food additives. The term "food additive" is intended to mean the compounds listed in and corresponding to the Codex Alimentarius of the FAO/WHO—version 2013.

Furthermore, the minerals, the alkaline metal bicarbonate, or the co-formulants listed in the present specification, in particular those listed in items 1 to 26, are usable in organic agriculture according to EC regulation 834/2007.

Among the minerals listed in items 1 to 26, sodium bicarbonate is particularly advantageous since, in addition to being authorized by various organizations (such as the FDA in the United States) in human or animal food, it is has very favourable toxicological and eco-toxicological profiles and is well tolerated by all living organisms such as humans and mammals. For example, the plasma and blood of human beings naturally contains it at a concentration of about 1200 mg/l, and it holds an important pH-regulating role for these fluids.

Any of the co-formulants of items 7 to 26 may be in amorphous or crystalline form. However, it is preferred for the co-formulant or formulants to be in amorphous form, that is to say, in non-crystalline form. This is particularly the case for a co-formulant comprising silica. In this respect, non-crystalline precipitated silicas or non-crystalline fumed silicas are particularly recommended in any of the embodiments of the present invention.

It should be understood that any description, even though described in relation to a specific embodiment or mode, is applicable to and interchangeable with other embodiments or modes of the present invention.

Should the disclosure of any of the patents, patent applications, and publications that are incorporated herein by reference conflict with the present specification to the extent that it might render a term unclear, the present specification shall take precedence.

The examples that follow are intended for illustrating the invention. They should not be interpreted as limiting the scope of the claimed invention.

EXAMPLES

Example 1 (in Accordance with the Invention)

Testing with Contact of Two Insects Species on Powder/Grain Mixes

Two series of tests were conducted with contact of a powder mixed with wheat grains for two insects: *Sitophilus granarius* (also known as wheat weevil or grain weevil or «charancon du blé») and *Rhizopertha dominica*. These two insects are main insects degrading cereal stocks; they are particularly unsafe because they lay their eggs inside the cereals. *Rhizopertha dominica* is a beetle found nearly worldwide as a pest of stored cereal grains (wheat, rice, maize, . . . ) and also a major pest of nuts such as peanuts.

For the tests in Example 1, a powder containing 85 wt % sodium bicarbonate and 15 wt % of a silica gel was formed and then applied to wheat grains (obtained from organic farms, and untreated chemically before and after crop) prior to contacting the grains with a tested insect species. The sodium bicarbonate was sodium bicarbonate EF ('extra-fin') for which 90% of particles by weight is between 0 and 130 μm, and the silica gel was a milled silica gel with a D90 of about 70 μm.

Each test of each species was conducted as follows:
incorporating the powder (85 wt % sodium bicarbonate and 15 wt % of a silica gel) into a batch of 2 Kg of wheat grains in an amount sufficient to achieve 100 ppm, 300 ppm, 500 ppm and 1000 ppm of powder per weight of wheat grains in 4 separate batches of powder/wheat grains mixes; and for each repetition of test a new batch with new insects are repeated;
50 individuals of each insect species were deposited into a 2 Kg batch of wheat grains/powder mix;
the mortality was recorded after 3, 7, 10. 14, 21, 30, 42 days of contact with the powder/grain mix.

This test for each powder/grains mix was repeated three times for each insect species.

A control (with contact of untreated individuals) was also conducted in parallel for each species.

The results of the tests for *Sitophilus granarius* are shown in TABLE 1.

The results of the tests for *Rhizopertha dominica* are shown in TABLE 2.

TABLE 1

Test on *Sitophilus granarius* (wheat weevil or « charançon du blé »)
(in % death rate - mean values)

| | Numbers of days of contact | | | | | | |
|---|---|---|---|---|---|---|---|
| | 3 d | 7 d | 10 d | 14 d | 21 d | 30 d | 42 d |
| with 100 ppm BICAR + 15% silica gel | 0% | 0% | 2% | 0% | 7% | 10% | 10% |
| with 300 ppm BICAR + 15% silica gel | 0% | 0% | 0% | 2% | 10% | 15% | 16% |
| with 500 ppm BICAR + 15% silica gel | 0% | 0% | 0% | 6% | 11% | 17% | 19% |
| with 1000 ppm BICAR + 15% silica gel | 0% | 0% | 1% | 8% | 14% | 19% | 21% |
| Control | 0% | 0% | 1% | 2% | 4% | 6% | 7% |

TABLE 2

Test on *Rhizopertha dominica* (lesser grain borer or « capucin des grains »)
(in % death rate - mean values)

| | Numbers of days of contact | | | | | | |
|---|---|---|---|---|---|---|---|
| | 3 d | 7 d | 10 d | 14 d | 21 d | 30 d | 42 d |
| with 100 ppm BICAR + 15% silica gel | 0% | 0% | 0% | 3% | 5% | 9% | 9% |
| with 300 ppm BICAR + 15% silica gel | 0% | 0% | 0% | 2% | 10% | 12% | 15% |
| with 500 ppm BICAR + 15% silica gel | 0% | 0% | 1% | 4% | 15% | 17% | 17% |
| with 1000 ppm BICAR + 15% silica gel | 0% | 0% | 2% | 7% | 16% | 18% | 19% |
| control | 0% | 0% | 1% | 1% | 3% | 5% | 7% |

Example 2 (in Accordance with the Invention)

Testing with Contact of 3 Types of Insects Species with a Powder Mixed with Wheat Grain Tests were conducted on three different species which are major parasites found in grain/food storage units: two coleoptera and one lepidoptera:
*Tribolium confusum* (also known as flour bettle);
*Sitophilus oryzae* (also known as rice weevil, which is now the main pest found on wheat);
*Ephestia kuehniella* (also known as mill moth).

For the tests in Example 2, a powder containing 95 wt % sodium bicarbonate and 5 wt % silica was applied to wheat grains (obtained from organic farms) prior to contacting the grains with a tested species. The sodium bicarbonate was a sodium bicarbonate (Solvay Bicar®Food grade 0/4), with an average laser particle size of 25 μm. The co-formulant of the mineral was amorphous silica (Solvay Tixosil® 38 AB Food grade), with an average laser particle size of 25 μm (weight-average diameter).

A pre-mix of the sodim bicarbonate (85 wt %) and silica (15 wt %) was first made and then was milled into a 100 UPZ fine impact mill to form a powder with a D90 of about 60-70 μm.

The tests were carried out as follows:
incorporating the powder into a 2-kg batch of wheat grains in an amount sufficient to achieve 100 ppm, 200 ppm, and 300 ppm of powder per weight of wheat grains; for each dosage of powder and each parasite species test, a different 2 kg batch is used.
depositing 50 insects of each species on in batches of 2 kg of mixed powder+wheat grains to initiate contact;
maintaining contact at 22-25° C. with 60-63% relative humidity; and recording the rate of mortality as a function of time: 7, 8, 9, and up to 20 days of contact (or more if necessary) after initial contact.

The test for each batch of powder+grain was repeated three times for each insect species.

The results of the tests are shown for the 3 species of insects in TABLE 3 (100 ppm dosing or mg powder/kg of wheat), TABLE 4 (200 ppm dosing or mg powder/kg of wheat), and TABLE 5 (300 ppm dosing or mg powder/kg of wheat).

A control (with untreated individuals) in which the insects undergo the same manipulations to check the safety of the seeds and the viability of the insects on the food material without the powder) was also conducted in parallel for each species—see TABLE 6 (Control—no dosing of powder).

TABLE 3

Dosing: 100 ppm (mg powder/kg of wheat)
Insect population mortality (% M) vs. Number of days

|  | | Rep 1 | | | Rep 2 | | | Rep 3 | | | % M | % M |
|---|---|---|---|---|---|---|---|---|---|---|---|---|
|  | Days | D | A | % M | D | A | % M | D | A | % M | avg. | std dev |
| *Tribolium* | 7 | 0 | 50 | 0 | 0 | 50 | 0 | 0 | 50 | 0 | 0 | 0 |
| *confusum* | 8 | 8 | 42 | 16 | 4 | 46 | 8 | 5 | 45 | 10 | 11 | 4 |
|  | 9 | 9 | 41 | 18 | 10 | 40 | 20 | 7 | 43 | 14 | 17 | 3 |
|  | 10 | 12 | 38 | 24 | 15 | 35 | 30 | 13 | 37 | 26 | 27 | 3 |
|  | 15 | 35 | 15 | 70 | 38 | 12 | 76 | 31 | 19 | 62 | 69 | 7 |
|  | 16 | 37 | 13 | 74 | 42 | 8 | 84 | 43 | 7 | 86 | 81 | 6 |
|  | 17 | 40 | 10 | 80 | 46 | 4 | 92 | 48 | 2 | 96 | 89 | 8 |
|  | 18 | 44 | 6 | 88 | 49 | 1 | 98 | 50 | 0 | 100 | 95 | 6 |
|  | 20 | 50 | 0 | 100 | 50 | 0 | 100 | 50 | 0 | 100 | 100 | 0 |
| *Sitophilus* | 7 | 0 | 50 | 0 | 0 | 50 | 0 | 0 | 50 | 0 | 0 | 0 |
| *oryzae* | 8 | 1 | 49 | 2 | 2 | 48 | 4 | 1 | 49 | 2 | 3 | 1 |
|  | 9 | 2 | 48 | 4 | 3 | 47 | 6 | 2 | 48 | 4 | 5 | 1 |
|  | 10 | 7 | 43 | 14 | 8 | 42 | 16 | 5 | 45 | 10 | 13 | 3 |
|  | 15 | 39 | 11 | 78 | 42 | 8 | 84 | 39 | 11 | 78 | 80 | 3 |
|  | 16 | 40 | 10 | 80 | 46 | 4 | 92 | 43 | 7 | 86 | 86 | 6 |
|  | 17 | 45 | 5 | 90 | 50 | 0 | 100 | 47 | 3 | 94 | 95 | 5 |
|  | 18 | 48 | 2 | 96 | 50 | 0 | 100 | 50 | 0 | 100 | 99 | 2 |
|  | 20 | 50 | 0 | 100 | 50 | 0 | 100 | 50 | 0 | 100 | 100 | 0 |
| *Ephestia* | 7 | 8 | 42 | 16 | 5 | 45 | 10 | 3 | 47 | 6 | 11 | 5 |
| *Kuehniella* | 8 | 13 | 37 | 26 | 6 | 44 | 12 | 9 | 41 | 18 | 19 | 7 |
| (larve) | 9 | 16 | 34 | 32 | 12 | 38 | 24 | 13 | 37 | 26 | 27 | 4 |
|  | 10 | 20 | 30 | 40 | 22 | 28 | 44 | 24 | 26 | 48 | 44 | 4 |
|  | 15 | 50 | 0 | 100 | 50 | 0 | 100 | 50 | 0 | 100 | 100 | 0 |
|  | 16 | 50 | 0 | 100 | 50 | 0 | 100 | 50 | 0 | 100 | 100 | 0 |
|  | 17 | 50 | 0 | 100 | 50 | 0 | 100 | 50 | 0 | 100 | 100 | 0 |
|  | 18 | 50 | 0 | 100 | 50 | 0 | 100 | 50 | 0 | 100 | 100 | 0 |
|  | 20 | 50 | 0 | 100 | 50 | 0 | 100 | 50 | 0 | 100 | 100 | 0 |

D = Dead
A = Alive
% M = % mortality
rep = repeat

TABLE 4

Dosing: 200 ppm (mg powder/kg of wheat)
Insect population mortality (% M) vs. Number of days'

|  | | rep 1 | | | rep 2 | | | rep 3 | | | % M | % M |
|---|---|---|---|---|---|---|---|---|---|---|---|---|
|  | Days | D | A | % M | D | A | % M | D | A | % M | avg. | std dev |
| *Tribolium* | 7 | 3 | 47 | 6 | 2 | 48 | 4 | 4 | 46 | 8 | 6 | 2 |
| *confusum* | 8 | 9 | 41 | 18 | 5 | 45 | 10 | 11 | 39 | 22 | 17 | 6 |
|  | 9 | 13 | 37 | 26 | 12 | 38 | 24 | 18 | 32 | 36 | 29 | 6 |
|  | 10 | 22 | 28 | 44 | 20 | 30 | 40 | 24 | 26 | 48 | 44 | 4 |
|  | 11 | 30 | 20 | 60 | 29 | 21 | 58 | 35 | 15 | 70 | 63 | 6 |
|  | 12 | 41 | 9 | 82 | 37 | 13 | 74 | 43 | 7 | 86 | 81 | 6 |
|  | 13 | 46 | 4 | 92 | 48 | 2 | 96 | 48 | 2 | 96 | 95 | 2 |
|  | 14 | 50 | 0 | 100 | 50 | 0 | 100 | 50 | 0 | 100 | 100 | 0 |
|  | 15 | 50 | 0 | 100 | 50 | 0 | 100 | 50 | 0 | 100 | 100 | 0 |
| *Sitophilus* | 7 | 5 | 45 | 10 | 2 | 48 | 4 | 6 | 44 | 12 | 9 | 4 |
| *oryzae* | 8 | 8 | 42 | 16 | 4 | 46 | 8 | 9 | 41 | 18 | 14 | 5 |
|  | 9 | 12 | 38 | 24 | 10 | 40 | 20 | 13 | 37 | 26 | 23 | 3 |
|  | 10 | 19 | 31 | 38 | 16 | 34 | 32 | 20 | 30 | 40 | 37 | 4 |
|  | 11 | 27 | 23 | 54 | 24 | 26 | 48 | 29 | 21 | 58 | 53 | 5 |
|  | 12 | 34 | 16 | 68 | 38 | 12 | 76 | 44 | 6 | 88 | 77 | 10 |

TABLE 4-continued

Dosing: 200 ppm (mg powder/kg of wheat)
Insect population mortality (% M) vs. Number of days'

|  | | rep 1 | | | rep 2 | | | rep 3 | | | % M | % M |
|---|---|---|---|---|---|---|---|---|---|---|---|---|
|  | Days | D | A | % M | D | A | % M | D | A | % M | avg. | std dev |
|  | 13 | 41 | 9 | 82 | 43 | 7 | 86 | 49 | 1 | 98 | 89 | 8 |
|  | 14 | 45 | 5 | 90 | 50 | 0 | 100 | 50 | 0 | 100 | 97 | 6 |
|  | 15 | 50 | 0 | 100 | 50 | 0 | 100 | 50 | 0 | 100 | 100 | 0 |
| *Ephestia* | 7 | 32 | 18 | 64 | 29 | 21 | 58 | 36 | 14 | 72 | 65 | 7 |
| *Kuehniella* | 8 | 45 | 5 | 90 | 41 | 9 | 82 | 43 | 7 | 86 | 86 | 4 |
| (larve) | 9 | 50 | 0 | 100 | 50 | 0 | 100 | 47 | 3 | 94 | 98 | 3 |
|  | 10 | 50 | 0 | 100 | 50 | 0 | 100 | 50 | 0 | 100 | 100 | 0 |
|  | 11 | 50 | 0 | 100 | 50 | 0 | 100 | 50 | 0 | 100 | 100 | 0 |
|  | 12 | 50 | 0 | 100 | 50 | 0 | 100 | 50 | 0 | 100 | 100 | 0 |
|  | 13 | 50 | 0 | 100 | 50 | 0 | 100 | 50 | 0 | 100 | 100 | 0 |
|  | 14 | 50 | 0 | 100 | 50 | 0 | 100 | 50 | 0 | 100 | 100 | 0 |
|  | 15 | 50 | 0 | 100 | 50 | 0 | 100 | 50 | 0 | 100 | 100 | 0 |

D = Dead
A = Alive
% M = % mortality
rep = repeat

TABLE 5

Dosing: 300 ppm (mg powder/kg of wheat)
Insect population mortality (% M) vs. Number of days

|  | | rep 1 | | | rep 2 | | | rep 3 | | | % M | % M |
|---|---|---|---|---|---|---|---|---|---|---|---|---|
|  | Days | D | A | % M | D | A | % M | D | A | % M | avg. | std dev |
| *Tribolium* | 7 | 4 | 46 | 8 | 8 | 42 | 16 | 5 | 45 | 10 | 11 | 4 |
| *confusum* | 8 | 6 | 44 | 12 | 12 | 38 | 24 | 8 | 42 | 16 | 17 | 6 |
|  | 9 | 11 | 39 | 22 | 17 | 33 | 34 | 16 | 34 | 32 | 29 | 6 |
|  | 10 | 19 | 31 | 38 | 24 | 26 | 48 | 22 | 28 | 44 | 43 | 5 |
|  | 11 | 28 | 22 | 56 | 39 | 11 | 78 | 40 | 10 | 80 | 71 | 13 |
|  | 12 | 47 | 3 | 94 | 50 | 0 | 100 | 45 | 5 | 90 | 95 | 5 |
|  | 13 | 50 | 0 | 100 | 50 | 0 | 100 | 50 | 0 | 100 | 100 | 0 |
|  | 14 | 50 | 0 | 100 | 50 | 0 | 100 | 50 | 0 | 100 | 100 | 0 |
|  | 15 | 50 | 0 | 100 | 50 | 0 | 100 | 50 | 0 | 100 | 100 | 0 |
| *Sitophilus* | 7 | 9 | 41 | 18 | 11 | 39 | 22 | 13 | 37 | 26 | 22 | 4 |
| *oryzae* | 8 | 12 | 38 | 24 | 17 | 33 | 34 | 15 | 35 | 30 | 29 | 5 |
|  | 9 | 15 | 35 | 30 | 19 | 31 | 38 | 20 | 30 | 40 | 36 | 5 |
|  | 10 | 21 | 29 | 42 | 29 | 21 | 58 | 26 | 24 | 52 | 51 | 8 |
|  | 11 | 30 | 20 | 60 | 38 | 12 | 76 | 35 | 15 | 70 | 69 | 8 |
|  | 12 | 38 | 12 | 76 | 42 | 8 | 84 | 40 | 10 | 80 | 80 | 4 |
|  | 13 | 46 | 4 | 92 | 49 | 1 | 98 | 44 | 6 | 88 | 93 | 5 |
|  | 14 | 50 | 0 | 100 | 50 | 0 | 100 | 49 | 1 | 98 | 99 | 1 |
|  | 15 | 50 | 0 | 100 | 50 | 0 | 100 | 50 | 0 | 100 | 100 | 0 |
| *Ephestia* | 7 | 38 | 12 | 76 | 33 | 17 | 66 | 42 | 8 | 84 | 75 | 9 |
| *Kuehniella* | 8 | 44 | 6 | 88 | 40 | 10 | 80 | 46 | 4 | 92 | 87 | 6 |
| (larve) | 9 | 49 | 1 | 98 | 47 | 3 | 94 | 50 | 0 | 100 | 97 | 3 |
|  | 10 | 50 | 0 | 100 | 50 | 0 | 100 | 50 | 0 | 100 | 100 | 0 |
|  | 11 | 50 | 0 | 100 | 50 | 0 | 100 | 50 | 0 | 100 | 100 | 0 |
|  | 12 | 50 | 0 | 100 | 50 | 0 | 100 | 50 | 0 | 100 | 100 | 0 |
|  | 13 | 50 | 0 | 100 | 50 | 0 | 100 | 50 | 0 | 100 | 100 | 0 |
|  | 14 | 50 | 0 | 100 | 50 | 0 | 100 | 50 | 0 | 100 | 100 | 0 |
|  | 15 | 50 | 0 | 100 | 50 | 0 | 100 | 50 | 0 | 100 | 100 | 0 |

D = Dead
A = Alive
% M = % mortality
rep = repeat

TABLE 6

Control (no powder used)
Insect population mortality (% M) vs. Number of days

| | | rep 1 | | | rep 2 | | | rep 3 | | | % M | % M |
|---|---|---|---|---|---|---|---|---|---|---|---|---|
| | Days | D | A | % M | D | A | % M | D | A | % M | avg. | std dev |
| Tribolium | 7 | 0 | 50 | 0.0 | 0 | 50 | 0.0 | 0 | 50 | 0.0 | 0 | 0 |
| confusum | 8 | 0 | 50 | 0.0 | 0 | 50 | 0.0 | 0 | 50 | 0.0 | 0 | 0 |
| | 9 | 0 | 50 | 0.0 | 0 | 50 | 0.0 | 0 | 50 | 0.0 | 0 | 0 |
| | 10 | 0 | 50 | 0.0 | 0 | 50 | 0.0 | 0 | 50 | 0.0 | 0 | 0 |
| | 11 | 0 | 50 | 0.0 | 0 | 50 | 0.0 | 0 | 50 | 0.0 | 0 | 0 |
| | 12 | 0 | 50 | 0.0 | 0 | 50 | 0.0 | 0 | 50 | 0.0 | 0 | 0 |
| | 13 | 1 | 49 | 2.0 | 2 | 48 | 4.0 | 0 | 50 | 0.0 | 2 | 2 |
| | 14 | 2 | 48 | 4.0 | 2 | 48 | 4.0 | 1 | 49 | 2.0 | 3 | 1 |
| | 15 | 2 | 48 | 4.0 | 3 | 47 | 6.0 | 1 | 49 | 2.0 | 4 | 2 |
| Sitophilus | 7 | 0 | 50 | 0.0 | 0 | 50 | 0.0 | 0 | 50 | 0.0 | 0 | 0 |
| oryzae | 8 | 0 | 50 | 0.0 | 0 | 50 | 0.0 | 0 | 50 | 0.0 | 0 | 0. |
| | 9 | 0 | 50 | 0.0 | 0 | 50 | 0.0 | 0 | 50 | 0.0 | 0 | 0 |
| | 10 | 0 | 50 | 0.0 | 0 | 50 | 0.0 | 0 | 50 | 0.0 | 0 | 0 |
| | 11 | 0 | 50 | 0.0 | 0 | 50 | 0.0 | 1 | 49 | 2.0 | 1 | 1 |
| | 12 | 0 | 50 | 0.0 | 0 | 50 | 0.0 | 1 | 49 | 2.0 | 1 | 1 |
| | 13 | 0 | 50 | 0.0 | 0 | 50 | 0.0 | 1 | 49 | 2.0 | 1 | 1 |
| | 14 | 0 | 50 | 0.0 | 0 | 50 | 0.0 | 1 | 49 | 2.0 | 1 | 1 |
| | 15 | 0 | 50 | 0.0 | 0 | 50 | 0.0 | 2 | 48 | 4.0 | 1 | 2 |
| Ephestia | 7 | 0 | 50 | 0.0 | 0 | 50 | 0.0 | 0 | 50 | 0.0 | 0 | 0 |
| Kuehniella | 8 | 0 | 50 | 0.0 | 0 | 50 | 0.0 | 0 | 50 | 0.0 | 0 | 0 |
| (larve) | 9 | 0 | 50 | 0.0 | 0 | 50 | 0.0 | 0 | 50 | 0.0 | 0 | 0 |
| | 10 | 0 | 50 | 0.0 | 1 | 49 | 2.0 | 0 | 50 | 0.0 | 0.7 | 1.2 |
| | 11 | 0 | 50 | 0.0 | 1 | 49 | 2.0 | 0 | 50 | 0.0 | 0.7 | 1.2 |
| | 12 | 0 | 50 | 0.0 | 2 | 48 | 4.0 | 1 | 49 | 2.0 | 2 | 2 |
| | 13 | 2 | 48 | 4.0 | 2 | 48 | 4.0 | 2 | 48 | 4.0 | 4 | 0 |
| | 14 | 2 | 48 | 4.0 | 2 | 48 | 4.0 | 3 | 47 | 6.0 | 5 | 1 |
| | 15 | 4 | 46 | 8.0 | 3 | 47 | 6.0 | 5 | 45 | 10.0 | 8 | 2 |

D = Dead
A = Alive
% M = % mortality
rep = repeat

From the data above it is noticeable that the mortality rate of the insects into the mix wheat/mineral powder (conditions 1 and 2) is quite similar to their natural mortality rate in the absence of any food and mineral powder (Blank test or control). Thus, the mineral powder acts as barrier between the insects and their food (wheat gains). This confirms that the mineral powder is not harmful to the insects and in particular is non-parasiticidal when doses are adapted, in particular to be at a mortality rate of at most 15+/−4% after 7 days.

One may see also that mortality rate is also higher with larve. This enables to reduce doses if only a prophylactic treatment is desired against larve without acting on individual insect adults.

Example 3 (in Accordance with the Invention)

Testing with Contact with Primary Insect Pest and Secondary Insect Pest with a Powder Mixed with Wheat Grain Tests were conducted on similar conditions as Example 2 on organic untreated wheat (depositing 50 insects of each species on batches of 2 kg of mixed powder+wheat grains to initiate contact; maintaining contact at 22-25° C. with 60-63% relative humidity) but with a powder comprising 95% sodium bicarbonate and 5% silica, and a mean particle size less than 63 μm.

*Sitophylus Oryzae* (Rice weevil) was used as representative specy of Primary insect pest.

*Tribolium Confusum* (Flour beetle) was used as representative specy of Secondary insect pest.

The insects were not starved initially (ie normally fed before test), and each test performed three times to calculate a mean value and a standard deviation regarding repeatability.

Results are listed in tables 7 and 8 (Legend: D: dead, A: alive, M: mortality They show that an amount of 100 to 200 ppm, of an alkali bicarbonate powder of such particle size, the prophylactic effect is remarquable on typical primary and secondary insects pest of grains. Access to food of the insects is limited when doses increases and gives a mortality rate of insects that can be close or superior or equal to the mortality rate of insect deprived of wheat grains.

TABLE 7

TEST ON *SITOPHILUS ORYZA*
Insect population mortality (%) vs. Number of days

| Dose added to wheat | Days | rep 1 D | rep 1 A | rep 1 % M | rep 2 D | rep 2 A | rep 2 % M | rep 3 D | rep 3 A | rep 3 % M | % M Mean value | % M Std Dev |
|---|---|---|---|---|---|---|---|---|---|---|---|---|
| 50 ppm | 5 | 0 | 50 | 0 | 0 | 50 | 0 | 0 | 50 | 0 | 0 | 0 |
|  | 7 | 0 | 50 | 0 | 0 | 50 | 0 | 0 | 50 | 0 | 0 | 0 |
|  | 10 | 2 | 48 | 4 | 1 | 49 | 2 | 1 | 49 | 2 | 3 | 1 |
|  | 15 | 8 | 42 | 16 | 7 | 43 | 14 | 4 | 46 | 8 | 13 | 4 |
|  | 20 | 9 | 41 | 18 | 12 | 38 | 24 | 11 | 39 | 22 | 21 | 3 |
|  | 30 | 13 | 37 | 26 | 20 | 30 | 40 | 18 | 32 | 36 | 34 | 7 |
| 100 ppm | 5 | 0 | 50 | 0 | 0 | 50 | 0 | 0 | 50 | 0 | 0 | 0 |
|  | 7 | 0 | 50 | 0 | 1 | 49 | 2 | 0 | 50 | 0 | 1 | 1 |
|  | 10 | 0 | 50 | 0 | 1 | 49 | 2 | 1 | 49 | 2 | 1 | 1 |
|  | 15 | 3 | 47 | 6 | 4 | 46 | 8 | 2 | 48 | 4 | 6 | 2 |
|  | 20 | 22 | 28 | 44 | 25 | 25 | 50 | 21 | 29 | 42 | 45 | 4 |
|  | 30 | 36 | 14 | 72 | 38 | 12 | 76 | 31 | 19 | 62 | 70 | 7 |
| 150 ppm | 5 | 0 | 50 | 0 | 0 | 50 | 0 | 0 | 50 | 0 | 0 | 0 |
|  | 7 | 2 | 48 | 4 | 1 | 49 | 2 | 0 | 50 | 0 | 2 | 2 |
|  | 10 | 5 | 45 | 10 | 7 | 43 | 14 | 1 | 49 | 2 | 9 | 6 |
|  | 15 | 33 | 17 | 66 | 38 | 12 | 76 | 26 | 24 | 52 | 65 | 12 |
|  | 20 | 45 | 5 | 90 | 41 | 9 | 82 | 40 | 10 | 80 | 84 | 5 |
|  | 30 | 50 | 0 | 100 | 50 | 0 | 100 | 50 | 0 | 100 | 100 | 0 |
| 200 ppm | 5 | 0 | 50 | 0 | 0 | 50 | 0 | 0 | 50 | 0 | 0 | 0 |
|  | 7 | 1 | 49 | 2 | 1 | 49 | 2 | 0 | 50 | 0 | 1 | 1 |
|  | 10 | 8 | 42 | 16 | 9 | 41 | 18 | 5 | 45 | 10 | 15 | 4 |
|  | 15 | 40 | 10 | 80 | 36 | 14 | 72 | 38 | 12 | 76 | 76 | 4 |
|  | 20 | 48 | 2 | 96 | 50 | 0 | 100 | 50 | 0 | 100 | 99 | 2 |
|  | 30 | 50 | 0 | 100 | 50 | 0 | 100 | 50 | 0 | 100 | 100 | 0 |
| Untreated (with grains) | 5 | 0 | 50 | 0 | 0 | 50 | 0 | 0 | 50 | 0 | 0 | 0 |
|  | 7 | 0 | 50 | 0 | 0 | 50 | 0 | 0 | 50 | 0 | 0 | 0 |
|  | 10 | 0 | 50 | 0 | 0 | 50 | 0 | 0 | 50 | 0 | 0 | 0 |
|  | 15 | 0 | 50 | 0 | 0 | 50 | 0 | 0 | 50 | 0 | 0 | 0 |
|  | 20 | 0 | 50 | 0 | 0 | 50 | 0 | 1 | 49 | 2 | 1 | 1 |
|  | 30 | 1 | 49 | 2 | 1 | 49 | 2 | 3 | 47 | 6 | 3 | 2 |
| Untreated (without grains) | 5 | 0 | 50 | 0 | 0 | 50 | 0 | 0 | 50 | 0 | 0 | 0 |
|  | 7 | 3 | 47 | 6 | 1 | 49 | 2 | 0 | 50 | 0 | 3 | 3 |
|  | 10 | 6 | 44 | 12 | 4 | 46 | 8 | 3 | 47 | 6 | 9 | 3 |
|  | 15 | 37 | 13 | 74 | 30 | 20 | 60 | 33 | 17 | 66 | 67 | 7 |
|  | 20 | 47 | 3 | 94 | 48 | 2 | 96 | 50 | 0 | 100 | 97 | 3 |
|  | 30 | 50 | 0 | 100 | 50 | 0 | 100 | 50 | 0 | 100 | 100 | 0 |

TABLE 8

TEST ON *TRIBOLIUM CONFUSUM*
Insect population mortality (%) vs. Number of days

| Dose added to wheat | Days | rep 1 D | rep 1 A | rep 1 % M | rep 2 D | rep 2 A | rep 2 % M | rep 3 D | rep 3 A | rep 3 % M | % M Mean value | % M Std Dev |
|---|---|---|---|---|---|---|---|---|---|---|---|---|
| 50 ppm | 5 | 0 | 50 | 0 | 0 | 50 | 0 | 0 | 50 | 0 | 0 | 0 |
|  | 7 | 0 | 50 | 0 | 0 | 50 | 0 | 0 | 50 | 0 | 0 | 0 |
|  | 10 | 2 | 48 | 4 | 1 | 49 | 2 | 0 | 50 | 0 | 2 | 2 |
|  | 15 | 4 | 46 | 8 | 1 | 49 | 2 | 2 | 48 | 4 | 5 | 3 |
|  | 20 | 9 | 41 | 18 | 7 | 43 | 14 | 6 | 44 | 12 | 15 | 3 |
|  | 30 | 11 | 39 | 22 | 14 | 36 | 28 | 15 | 35 | 30 | 27 | 4 |
| 100 ppm | 5 | 0 | 50 | 0 | 0 | 50 | 0 | 0 | 50 | 0 | 0 | 0 |
|  | 7 | 0 | 50 | 0 | 0 | 50 | 0 | 0 | 50 | 0 | 0 | 0 |
|  | 10 | 6 | 44 | 12 | 0 | 50 | 0 | 1 | 49 | 2 | 5 | 6 |
|  | 15 | 8 | 42 | 16 | 4 | 46 | 8 | 2 | 48 | 4 | 9 | 6 |
|  | 20 | 11 | 39 | 22 | 13 | 37 | 26 | 15 | 35 | 30 | 26 | 4 |
|  | 30 | 37 | 13 | 74 | 40 | 10 | 80 | 34 | 16 | 68 | 74 | 6 |
| 150 ppm | 5 | 0 | 50 | 0 | 0 | 50 | 0 | 0 | 50 | 0 | 0 | 0 |
|  | 7 | 1 | 49 | 2 | 0 | 50 | 0 | 0 | 50 | 0 | 1 | 1 |
|  | 10 | 4 | 46 | 8 | 2 | 48 | 4 | 3 | 47 | 6 | 6 | 2 |
|  | 15 | 26 | 24 | 52 | 29 | 21 | 58 | 22 | 28 | 44 | 51 | 7 |
|  | 20 | 41 | 9 | 82 | 50 | 0 | 100 | 44 | 6 | 88 | 90 | 9 |
|  | 30 | 50 | 0 | 100 | 50 | 0 | 100 | 50 | 0 | 100 | 100 | 0 |

TABLE 8-continued

TEST ON *TRIBOLIUM CONFUSUM*
Insect population mortality (%) vs. Number of days

| Dose added to wheat | Days | rep 1 | | | rep 2 | | | rep 3 | | | % M Mean value | % M Std Dev |
|---|---|---|---|---|---|---|---|---|---|---|---|---|
| | | D | A | % M | D | A | % M | D | A | % M | | |
| 200 ppm | 5 | 0 | 50 | 0 | 0 | 50 | 0 | 1 | 49 | 2 | 1 | 1 |
| | 7 | 2 | 48 | 4 | 1 | 49 | 2 | 1 | 49 | 2 | 3 | 1 |
| | 10 | 10 | 40 | 20 | 5 | 45 | 10 | 6 | 44 | 12 | 14 | 5 |
| | 15 | 42 | 8 | 84 | 40 | 10 | 80 | 39 | 11 | 78 | 81 | 3 |
| | 20 | 50 | 0 | 100 | 50 | 0 | 100 | 47 | 3 | 94 | 98 | 3 |
| | 30 | 50 | 0 | 100 | 50 | 0 | 100 | 50 | 0 | 100 | 100 | 0 |
| Untreated (with grains) | 5 | 0 | 50 | 0 | 0 | 50 | 0 | 0 | 50 | 0 | 0 | 0 |
| | 7 | 0 | 50 | 0 | 0 | 50 | 0 | 0 | 50 | 0 | 0 | 0 |
| | 10 | 0 | 50 | 0 | 1 | 49 | 2 | 0 | 50 | 0 | 1 | 1 |
| | 15 | 0 | 50 | 0 | 1 | 49 | 2 | 1 | 49 | 2 | 1 | 1 |
| | 20 | 1 | 49 | 2 | 1 | 49 | 2 | 1 | 49 | 2 | 2 | 0 |
| | 30 | 3 | 47 | 6 | 2 | 48 | 4 | 3 | 47 | 6 | 5 | 1 |
| Untreated (without grains) | 5 | 2 | 48 | 4 | 1 | 49 | 2 | 1 | 49 | 2 | 3 | 1 |
| | 7 | 2 | 48 | 4 | 2 | 48 | 4 | 1 | 49 | 2 | 3 | 1 |
| | 10 | 4 | 46 | 8 | 4 | 46 | 8 | 4 | 46 | 8 | 8 | 0 |
| | 15 | 26 | 24 | 52 | 22 | 28 | 44 | 20 | 30 | 40 | 45 | 6 |
| | 20 | 47 | 3 | 94 | 50 | 0 | 100 | 50 | 0 | 100 | 98 | 3 |
| | 30 | 50 | 0 | 100 | 50 | 0 | 100 | 50 | 0 | 100 | 100 | 0 |

Example 4 (in Accordance with the Invention)

Testing of Different Alkaline Metal Bicarbonate with Contact with Insect Pest with a Powder Mixed with Wheat Grain Tests are conducted on similar conditions as Example 3 on organic untreated wheat with three different powders of different alkaline metal bicarbonate: sodium bicarbonate, potassium bicarbonate, and trona (comprising 93% sodium sesquicarbonate) and test influence of particle size of the powders according present invention.

Said three alkaline metal bicarbonates of coarse particle size (mean particle size between 220 and 280 μm) are mixed with 2% silica (Solvay Tixosil® 38 AB Food grade) to obtain three different composition comprising 98 wt % alkaline metal bicarbonates and 2 wt % silica.

Tests are performed on *Sitophylus Oryzae* (Rice weevil) at different doses from 200 to 2000 ppm plus a blank test without grains (insects deprived of grains). To achieve same efficacy as example 3 results in mortality rate the dosing of the three powders (98/2) has to reach values of about 1430 to 1880 ppm due to less effective mechanical barrier with coarser bicarbonates particle size.

Example 5 (in Accordance with the Invention)

Test on Alkaline Metal Bicarbonate Powder on Removing Dust of Grains

In this test, impact of the use of fine alkaline metal bicarbonate on the separation of dust of coarse food product (wheat grains) is evaluated. Clean wheat (provider: VERSELE-LAGA) is mixed with 0 (blank test), 0.7% and 1.5% of integral wheat flour (PRIMEAL type 150) simulating dust of grains.

Said three mixtures at 0, 0.7 and 1.5% of flour was mixed with the sodium bicarbonate powder used at example 3, with an amount of 0.1 and 0.2 wt % (1000 and 2000 ppm) of bicarbonate powder reported to the weight of wheat grain and wheat flour mixtures.

The following equipments were used to simulate an dust air separator:
  Vibrating sieve apparatus RETSCH AS 200 Digit
  Precision laboratory balances: METTLER PG5002-S and SARTORIUS BP 121 S.
  Sieve of 2 mm (n° 1).
  RETSCH standard sieve lid equipped with an air extractor to achieve an air velocity of 0.3 m/s above sieve.
  For this test the following operating conditions were used
  Preparation of wheat, dust and sodium bicarbonate powder mixtures:
  Wheat division and weighing about 85 to 95 g of clean wheat.
  For tests with added dust, the calculated quantity of dust to be added is done (the quantity of dust is calculated according to the quantity of clean wheat weighed).
  For tests with addition of sodium bicarbonate powder, the calculated quantity of powder to be added (the quantity of powder is calculated according to the quantity of clean wheat weighed).
  Homogenization of mixtures with WAB Turbula mixer.
  Sieving clean or dirty wheat on the RETSCH sieve for 10 min with a 90% set vibration level. The air extraction is started before starting the sieving and stopped after stopping the sieving when tested.
  The intermediate bottom of sieve is weighed and also the 2 mm sieve with cleaned wheat, to make a precise weight loss balance on the dust removed.
  SEM pictures of wheat kernels after testing were performed.
  Results are given on Table 9.

One can see that when sodium bicarbonate powder is added before separating fines of food product, the dedusting is sensitively improved:
  at least all the equivalent weight of the integrale flour added to simulate dust, plus the sodium bicarbonate mixture weight are removed when air suction is performed (with results from 108 to 111% weight of fines removed by sieving and air succion)
  comparatively, without sodium bicarbonate powder, only 84% (with 0.7% flour added) or 94% (with 1.5% flour added). This shows that fine dust (comprising mainly carbohydrates and wheat bran cellulose from the integral wheat flour) are usefully.

SEM pictures of corresponding samples show a decreased amout of impurities and dust fixed on the grains, though with numerous fine particles of sodium bicarbonate mixture still on the surface of the grains.

TABLE 9

DUST REMOVAL TESTS FROM GRAINS

| Operating conditions on 2 mm sieved) | | | Flour 150 before dedusting | Flour 150 + bicarbonate powder before dedusting | Loss of weight of wheet (dust sieved and/ or succed by air sliev | Efficacy of dust removed |
|---|---|---|---|---|---|---|
| Sieved product | | Venting | % | % | % | % |
| Clean wheat | without bicarbonate powder | No Yes | — 0.3 m/s | 0 0 | 0 0 | 0.02 0.22 | — — |
| Clean wheat | +0.1% bicarbonate | No Yes | — 0.3 m/s | 0 0 | 0.1 0.1 | 0.05 0.18 | 46 181 |
| | +0.2% bicarbonate | No Yes | — 0.3 m/s | 0 0 | 0.2 0.2 | 0.15 0.29 | 73 144 |
| Clean wheat + 0.7% | without bicarbonate powder | No Yes | — 0.3 m/s | 0.7 0.7 | 0.7 0.7 | 0.56 0.56 | 81 81 |
| Flour 150 | +0.1% bicarbonate | No Yes | — 0.3 m/s | 0.69 0.7 | 0.79 0.79 | 0.71 0.88 | 89 111 |
| | +0.2% bicarbonate | No Yes | — 0.3 m/s | 0.69 0.69 | 0.89 0.89 | 0.75 0.97 | 84 109 |
| Clean wheat + 1.5% | without bicarbonate powder | No Yes | — 0.3 m/s | 1.48 1.48 | 1.48 1.48 | 1.15 1.39 | 78 94 |
| Flour 150 | +0.1% bicarbonate powder | No Yes | — 0.3 m/s | 1.48 1.48 | 1.58 1.57 | 1.38 1.71 | 88 108 |
| | +0.2% bicarbonate powder | No Yes | — 0.3 m/s | 1.48 1.47 | 1.67 1.67 | 1.49 1.77 | 89 106 |

Example 6 (in Accordance with the Invention)

Testing on Alkali Bicarbonate Powders Impact on Explosivity Limit of Fines from Cereal Grains:

To test the influence of alkali bicarbonate powders on the inflammation and on explosivity limit of dust from cereals grains, a measure was done of the explosive limit of flour with and without alkaline bicarbonate powder.

Typical dust and broken grains after crop collection and handling in trucks, before dedusting, is generally in the range 0.7% to 1.5% in weight of fines on total stock. And a clean grain after mechanical and/or gas or air separators dedusting operation, ready to be stored, is comprises generally between 0.3 to 0.5% of dust.

This dust, when separated from grains, is generally very fine and requires attention to avoid inflammation or explosion, in particular during dry and hot summers The Lower Explosive Limit (LEL) of a dust is the minimum concentration of dust in the air above which the mixture can be ignited. The measurement is made in a stainless steel sphere of 20 liters with an ignition energy of 2 kJ (pyrotechnic primer).

Median value of particle size of powders used were <63 µm.

The concentration of dust is varied to a mixture with air for which no ignition occurs in three consecutive tests. This mixture is at the concentration of LEL.

To do this, the Lower Explosive Limit is done according to NF EN 14034-3 norm, with:

Flour alone (integral flour 150)
Mixture of flour (85 wt %) and alkali metal bicarbonate powder (15 wt %).

The results were the following and show a favourable impact to increase explosive limit (ie quantity of dust/m3) and so reducing risks of explosion hazards:

Lower Explosive Limit of sample 1 (flour alone): 90 g/m3.
Lower Explosive Limit of sample 2 (mixture of flour and bicarbonate powder): 200 g/m3.

Example 7 (in Accordance with the Invention)

Testing on a Silo Alkaline Metal Bicarbonate Powder Addition

The sodium bicarbonate and silica mixture from example 3 was used in an application trial for incorporation into 50 tons of common wheat when filling a cell and samples taken when emptying said cell, with the following conditions:
  Treatment at the top of an elevator (about 25m high) during the filling of the industrial cell
  Treatment for 30 min of 50 T at 200 g/T so at 200 ppm dosage
  Grain flow: 100 T/h loaded in the cell
  Sodium bicarbonate mixture flow: 20 Kg/h added with a venture dosing system and air sprayed on the wheat at top of the elevator feeding the cell.
  Samples during emptying:
    At the exit of the grains (3 samples)
    After passage to the separator cleaner (3 samples)
    Sample taking at the exit of the cell:
      Sample No. 1 cell bottom (sampling at the beginning of emptying)
      Sample N ° 2 middle of cell (sampling in half of emptying)

Sample No. 8 cell top (sampling at the end of emptying)

Sample taking after passage into the separator cleaner:

Sample N° 3 cell bottom (sampling at the beginning of emptying)

Sample N° 4 middle of cell (sampling in half of emptying)

Sample No. 9 top of cell (sampling at the end of emptying)

The measured quantity of sodium bicarbonate in corresponding wheat grains were as follows:

At the exit of cell before passage to separator cleaner

Samples 1, 2, 8 respectively: 202, 199, 202 ppm

After the passage in the separator cleaner

Samples 3, 4, 9 respectively: 134, 142, 149 ppm

Those results show that about 65% to 75% of the sodium bicarbonate mixture remain fixed in the food product (on grains) after (typical) air separator cleaner. This is useful for the prophylactic effect during grain (or beans or nuts) storage.

Therefore the alkaline metal bicarbonate in the food product should be increased typically from 25 to 50% above the targeted dose if added as auxiliary agent to help impurities and dust removal before mechanical or air separator if long-term storage is to be addressed.

The invention claimed is:

1. A method for treating a food product for:
    a combined prophylactic effect against the development in the food product stored in a storage silo of insects, acarids, fungi, and mycotoxins;
    and improving dedusting of the food product,
    wherein the food product is selected from the group consisting of grains, beans and nuts;
    said method comprising mixing at least 50 ppm and at most 500 ppm by weight of a powder with the food product to form a barrier screen between the parasites and their food,
    wherein the powder comprises more than 40% by weight of an alkali metal bicarbonate,
    wherein the powder is in the form of particles having a median particle size of at most 300 µm, and
    wherein the mixing of the powder to the food product is carried out by dry spraying, and
    wherein the method for improving dust separation is performed during mechanical or gas-flow separation.

2. The method according to claim 1, wherein the mechanical or gas-flow separation is conducted in mechanical separators on sieves or air separators.

3. The method according to claim 1, wherein at most 300 ppm by weight of the powder is mixed with the food product.

4. The method according to claim 1, wherein at most 200 ppm, or at most 150 ppm by weight of the powder is mixed with the food product.

5. The method according to claim 1, wherein at least 100 ppm by weight of the powder is mixed with the food product.

6. The method according to claim 1, wherein the powder comprises at least 50% by weight of the alkali metal bicarbonate, or at least 85% by weight of the alkali metal bicarbonate.

7. The method according to claim 1, wherein the alkali metal bicarbonate is selected from the group consisting of: sodium bicarbonate, potassium bicarbonate, sodium sesquicarbonate, trona, and mixtures thereof.

8. The method according to claim 1, wherein the powder comprises at least 1 wt. % of a co-formulant selected from the group consisting of a silica, a diatomaceous earth, an alkaline-earth metal silicate, a clay, a montmorillonite, a zeolite, and mixtures thereof.

9. The method according to claim 8, wherein the alkali metal bicarbonate is sodium bicarbonate and the co-formulant is a silica.

10. The method according to claim 8, wherein the powder comprises at most 50% by weight of the co-formulant, or at most 15% by weight of the co-formulant.

11. The method according to claim 1, wherein the median particle size of the powder is at most 100 µm.

12. The method according to claim 8, wherein particle size of the powder is of less than 100 µm.

13. The method according to claim 1, wherein the food product is grain seeds selected from the group consisting of Cereals, "pseudocereals", oil plants, legume seeds, beans, and nuts.

14. The method according to claim 1, wherein the parasite is at least one selected from the group consisting of: *Tribolium confusum, Sitophilus granarius* (grain weevil), *Sitophilus oryza* (rice weevil), *Rhizopertha dominica* (lesser grain borer), *Sitotroga cereallela, Acanthoscelides obtectu, Bruchus pisorum, Cryptolestes turcicus, Trogoderma granarium*, and *Ephestia* (flour moth).

15. The method according to claim 1, wherein the mortality rate of parasite in contact with food product is measured as a function of time at a temperature of at 23.5° C. +/−1.5° C. and at a relative humidity of 61.5% +/−1.5% and at 5, 7, 10, 15, 20 and 30 days of contact.

16. The method according to claim 15, wherein the powder in the food product is added at a dose so that the mortality rate of parasite in contact with food product is at most 15+/−4% after 7 days.

17. The method according to claim 1, wherein powder is free of neurotoxic pesticides, cytotoxic pesticides, organohalogenated pesticides, organophosphorus pesticides, or carbamates or free of (added) pyrethrum or of (added) synthetic pyrethroids.

18. The method according to claim 1, wherein the powder is non-parasiticidal.

19. A method for reducing the level of dust in ambient air and on walls in a silo using the method according to claim 1.

20. The method of claim 1, wherein the dry spraying is performed on a conveyor belt or on top of silo while filling the storage silo with food product, and the method further comprises:
    dedusting the food product during mechanical or gas-flow separation, wherein the mechanical or gas-flow separation is conducted in mechanical separators or sieves or air separators.

* * * * *